O. H. & A. F. PIEPER.
ELECTRICAL CONTROLLING APPARATUS.
APPLICATION FILED MAR. 6, 1911.
1,011,240.
Patented Dec. 12, 1911.
3 SHEETS—SHEET 1.
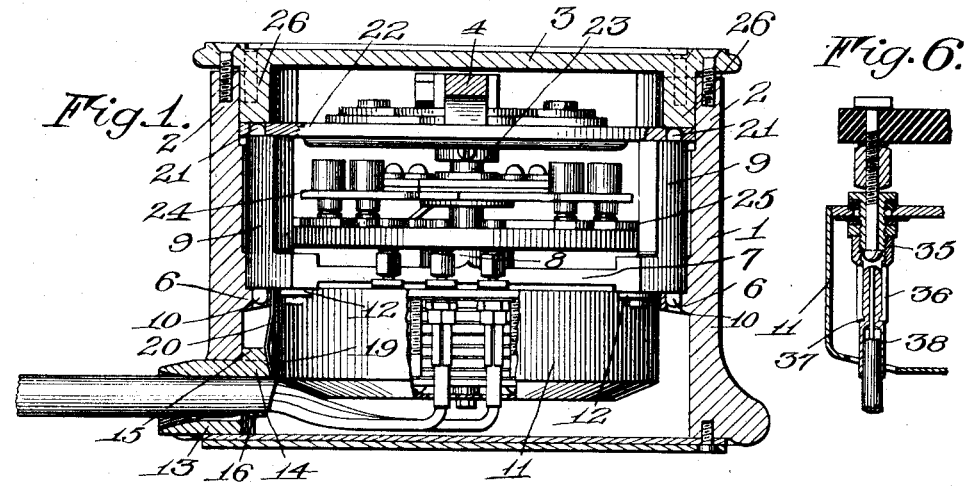
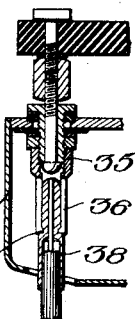
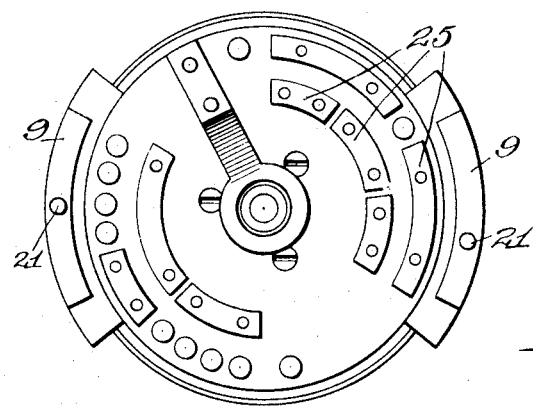
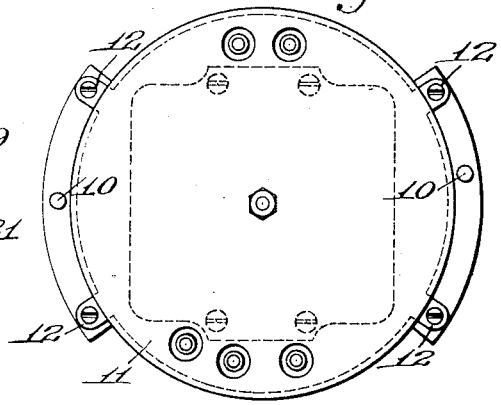
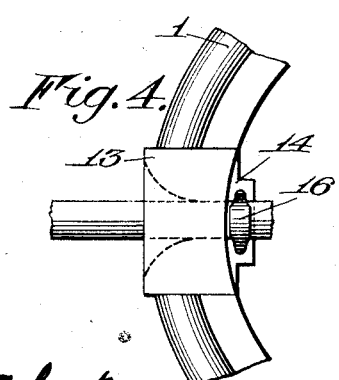
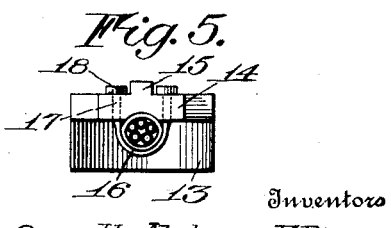
Inventors
Oscar H. & Alphonse F. Pieper O. H. & A. F. PIEPER.
ELECTRICAL CONTROLLING APPARATUS.
APPLICATION FILED MAR. 6, 1911.
1,011,240.
Patented Dec. 12, 1911.
3 SHEETS—SHEET 2.
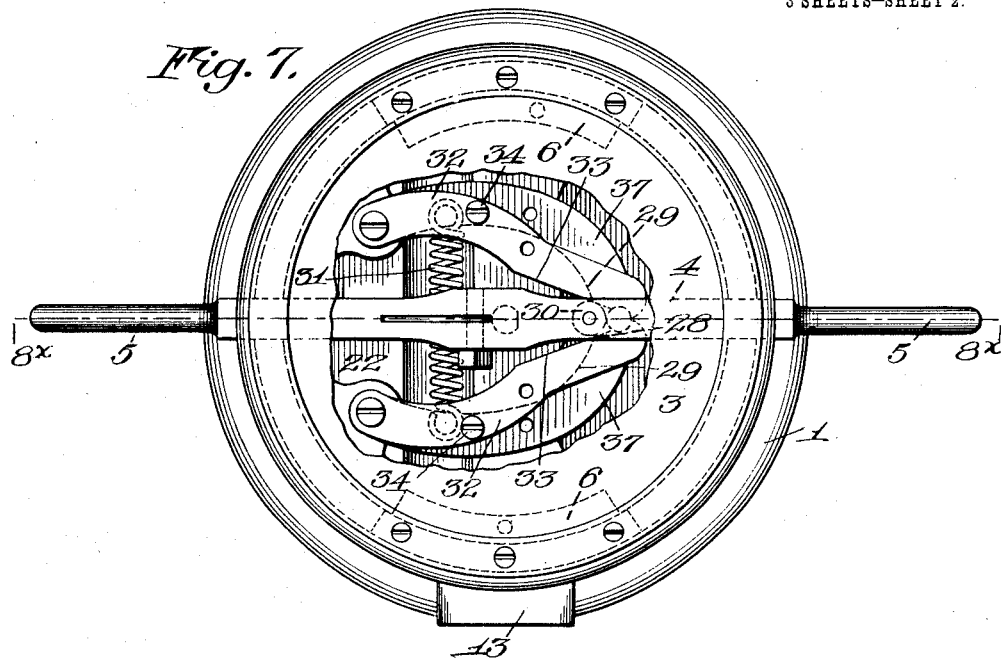
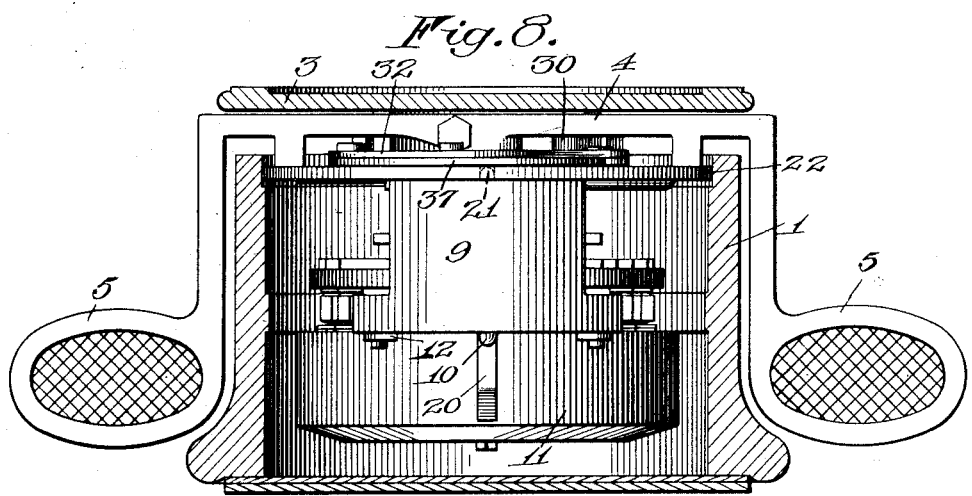
Inventors
Oscar H. + Alphonse F. Pieper O. H. & A. F. PIEPER.
ELECTRICAL CONTROLLING APPARATUS.
APPLICATION FILED MAR. 6, 1911.

1,011,240.

Patented Dec. 12, 1911.

3 SHEETS—SHEET 3.

Inventors
Oscar H. + Alphonse F. Pieper

Witnesses
H. E. Stonebraker
Nelson Copp

By
Their Attorneys

UNITED STATES PATENT OFFICE.

OSCAR H. PIEPER AND ALPHONSE F. PIEPER, OF ROCHESTER, NEW YORK.

ELECTRICAL CONTROLLING APPARATUS.

1,011,240.  Specification of Letters Patent.  Patented Dec. 12, 1911.

Application filed March 6, 1911. Serial No. 612,558.

*To all whom it may concern:*

Be it known that we, OSCAR H. PIEPER and ALPHONSE F. PIEPER, both of Rochester, in the county of Monroe and State of New York, have invented certain new and useful Improvements in Electrical Controlling Apparatus; and we do hereby declare the following to be a full, clear, and exact description of the same, reference being had to the accompanying drawings, forming a part of this specification, and to the reference-numerals marked thereon.

The invention relates to devices for controlling electric motors, especially those employed to operate dental apparatus, though capable of other uses and has for its object to provide means whereby all of the parts are separate and may be readily removed for the purpose of cleaning or repairing, being securely held in operative position by a simple fastening device.

The invention has for a further object the provision of an improved construction for starting, stopping, reversing, and controlling the speed of a motor by means of an oscillating switch-arm actuated by the operator, whereby the operating-lever may be under constant tension and held in desired adjusted position by the operator, or may be automatically held in any one of its adjustments.

To these and other ends the invention consists in certain improvements and combinations of parts all as will be hereinafter more fully described, the novel features being pointed out in the claims at the end of the specification.

Figure 9:
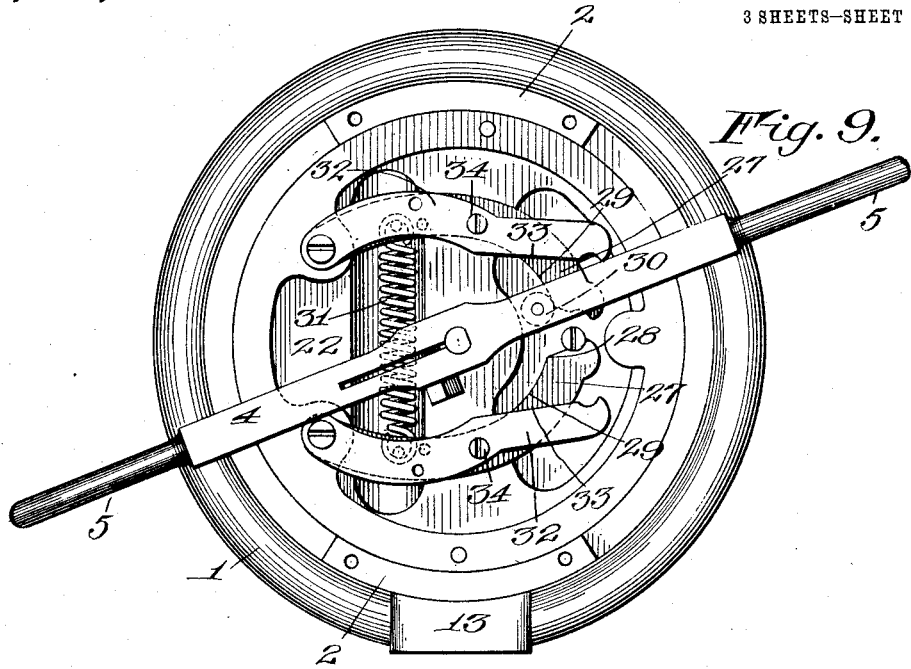
Figure 10:
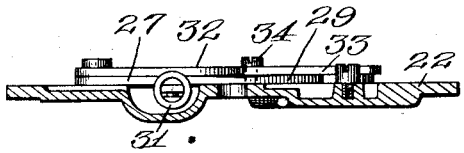
Figure 11:
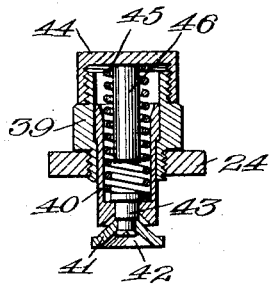

In the drawings: Figure 1 is a vertical sectional view of a controller with the cover-plate in position; Fig. 2 is a top plan view of the support for the switch contacts, showing the switch contact plate in position thereon; Fig. 3 is a bottom view, in elevation, of the support for the switch contacts, and the casing for the resistance coils carried thereby; Fig. 4 is a bottom view, in elevation, showing the wire outlet bushing positioned in the casing, the bottom of the casing being removed to show the parts more plainly; Fig. 5 is a view in side elevation of the outlet bushing, with the wires secured in position; Fig. 6 is a detail view, in section, of one of the plug connections; Fig. 7 is a top plan view of the controller, a portion of the cover plate being broken away, and showing the controller-operating lever, and the spring-operated arms coöperating therewith; Fig. 8 is a vertical sectional view on the line $8^x$—$8^x$ of Fig. 7, with parts in elevation; Fig. 9 is a top plan view of the controller, with the cover plate removed, showing the controller-operating lever in one of its adjusted positions; Fig. 10 is a detail view, in section, of the supporting plate for the controller-operating lever, with the spring operated arms in elevation, and Fig. 11 is a detail sectional view of one of the spring contact members carried by the contact-arm.

Similar reference numerals throughout the several figures indicate the same parts.

The main frame or casing of the controller embodies a metallic frame or ring 1, having at its upper end and on opposite sides the shoulders 2, upon which is fastened the cover plate 3, allowing spaces at the sides for the controlling lever 4, the latter being provided at its ends with pedals or operating portions 5. The frame or ring 1 is provided interiorly with flanges 6 having suitable openings therein. The support for the contacts, in the present embodiment, comprises a spider 7 having a central boss 8 to which the contact plate is attached, and upwardly extending shoulders 9 at its outer edge. Arranged on the underside of the shoulders 9 are suitable pins or lugs 10 arranged to engage the openings in the flanges 6, and by which the supporting frame for the contacts is locked against rotation in the casing. The resistance coils for the controller are suitably arranged within a casing 11 which is secured to the bottom of shoulders 9 by means of lugs 12.

Arranged in an opening at the bottom of the frame or ring 1, is a removable wire outlet bushing 13 provided with an inwardly extending shoulder 14 on its upper side, said shoulder having a lug 15 attached thereto, which latter is adapted to engage the inner wall of the frame or ring 1, so as to prevent removal of the bushing outwardly from the casing. The wires are held in position, relative to the outlet bushing.

by means of strap 16, having ends 17 extending through openings in the shoulder 14, and held by the nuts 18. The shoulder 14 is provided on its inner side with a beveled face 19, arranged to be engaged by a spring arm 20 which is carried by the casing 11, and adapted to hold the outlet bushing in proper position within the casing.

The shoulders 9 are provided on their upper edges with suitable pins or lugs 21. The controller-operating lever, in the present embodiment, is pivoted to the plate 22 which is provided at its outer edge with openings arranged to engage the pins or lugs 21 on the shoulders of the contact supporting frame. The controller-operating lever 4, which as stated, is pivoted to the plate 22, is mounted on shaft 23, the shaft carrying at its lower end a contact arm 24, to which are attached the contact members for engagement with the contacts 25.

In devices of this character, it has been found desirable to have all the parts separate, and to mount them so that they may readily be removed for the purpose of cleaning or repairing, and at the same time, in such a manner that they may all be held in operative position by a simple and readily attached securing device, and to this end, in the embodiment herein illustrated, the cover plate 3 is provided with downwardly extending shoulders 26, which are arranged to engage the top of plate 22. The cover plate being secured to the frame or ring 1, thus retains all of the parts in their proper position, while permitting quick removal upon detaching the cover plate. The contact supporting frame is positioned within the casing and held against rotation, while it serves, at once, to hold the wire outlet bushing in its proper relation, and preventing movement of the latter inwardly. Positioned upon the contact supporting frame is the plate to which the controller-operating lever is pivoted, the plate being held in interlocking engagement with the contact supporting frame therebeneath, and the cover plate engages the last mentioned plate and so serves to lock all of the elements.

In using the controller-operating lever, it is sometimes desirable to have it automatically held in any one of its adjustments, without necessitating that the operator maintain it in such position, and at other times it is preferable that it be entirely under the control of the operator, so that it must be held in adjusted position, and to this end, there are provided two alternative pairs of spring-operated arms, these being so relatively positioned that one or the other set may be moved to controlling position and not be interfered with by the position of the set in non-operative position. To this end, in the present embodiment, there are provided a lower pair of spring-operated arms 27 having at their upper ends the inclined portions 28. Adjacent to these inclined portions, the arms are curved outwardly, relatively to the controller-operating lever, as at 29, such curve being adjacent to the arc described by the contact point of the projection 30 carried by the controller-operating lever. When the projection 30 makes its initial engagement with arm 27, the latter is moved upwardly a trifle, against the tension of spring 31, and thereafter, the curved portion 29 of the arm is adjacent to the path of movement of projection 30, and thus serves to hold the projection, and controller-operating lever, in any one of the desired positions of adjustment. Positioned above the arms 27, and pivoted at the same points, are spring controlled arms 32, provided with inclined converging surfaces 33, the inclination of the surfaces 33 being so related to the pivotal points of the levers and to the arc of rotation of the projection 30, that the pressure of the spring tends to return the controller-operating lever to normal central position. This tendency is very slight and only sufficient to cause such action when the operator releases the controller-operating lever, and only a slight pressure is required to advance the lever to any of its positions of adjustment. The lower spring operated arms 27 are provided, each with a pair of openings arranged to coöperate with corresponding pairs of openings in the upper spring controlled arms 32, set screws 34, or other convenient means being employed to hold the upper pair of arms in one or the other position relative to the lower pair, according to the form of control desired. When the upper pair of spring controlled arms are adjusted, as shown in Fig. 9, the curved surfaces of the lower spring controlled arms are free to act on the projection 30, and retain the controller-operating lever in any one of its adjusted positions, and if it is desired to have the controller-operating lever under spring tension sufficient to return it to normal position at all times, the upper pair of arms are moved inwardly to the second position on the lower pair of arms, and are secured so as to permit the inclined converging surfaces 33 to act upon the projection 30.

Considerable difficulty has been experienced in mechanisms of this character, in furnishing a tight fitting, removable, and yieldable connection between the electric wires and the contact plate, and to obviate this, there is provided a plug, which, in the present instance, embodies an internally threaded collar 35 carrying a sleeve 36 split longitudinally to form yieldable arms, and provided at its lower end with an inwardly projecting flange 37. The end of the wire is secured to the terminal 38 having a transversely extending groove adapted to engage the flange 37 of the sleeve, and hold the parts together. In this manner, a very strong connection is provided between the yieldable sleeve and the terminal, permitting the latter to be removed, when desired, but serving to prevent effectually, any accidental removal.

In order to furnish a positive, but yieldable connection between the contact arm and the contacts, there has been provided a contact member, comprising in this embodiment of the invention, a collar 39 having a threaded portion by which it is secured to the contact arm 24. Slidably mounted within the collar 39 is a sleeve 40, provided with a shoulder which coöperates with a corresponding shoulder on the collar to limit the downward movement of the sleeve. A contact piece 41 is universally mounted on the end of the sleeve 40, and is cup-shaped to afford a lubricating space 42, the contact piece having attachment to the sleeve 40 by means of a rivet 43. Threaded to the upper end of the collar 39 is a cap or cover 44 and arranged between the bottom of sleeve 40 and the cap or cover, is an expansion coil spring 45, which serves, normally, to force the sleeve to its lowermost position, and affords a yieldable connection between the contact piece and the coöperating contact. It has been found in devices of this character, where a spring is employed, that a considerable amount of the current passes through the spring by reason of loose connections in the other parts, and this serves to quickly destroy the effectiveness of the spring. To obviate this difficulty, the cap or cover 44 is provided with a downwardly extending plug or projection 46 in contact with the spring 45 so that if current starts through the spring, it will pass through only a small portion of the same, going at once into the projection 46, and thus having no determinable effect on the spring.

We claim as our invention:

1. In a controller, the combination with a casing, of a removable support for the switch contacts and resistance elements, a plate positioned above the support, a controller-operating lever pivoted in the plate, and a coverplate secured to the top of the casing and adapted to hold the parts in operative position.

2. In a controller, the combination with a casing, of a conductor outlet bushing detachably mounted in the casing, a removable support for the switch contacts and resistance elements, a plate positioned above the support, a controller-operating lever pivoted on the plate, and a cover-plate secured to the top of the casing and adapted to hold the parts in operative position.

3. In a controller, the combination with a casing, of a conductor outlet bushing detachably mounted in the casing, a removable support for the switch contacts and resistance elements in engagement with the outlet bushing, a plate positioned above the support, a controller-operating lever pivoted on the plate, and a cover plate secured to the top of the casing and adapted to hold the parts in operative position.

4. In a controller, the combination with a casing, of a conductor outlet bushing detachably mounted in the casing, a removable support for the switch contacts and resistance elements provided with a member contacting with a portion of the outlet bushing, a plate positioned above the support, a controller-operating lever pivoted on the plate, and a cover plate secured to the top of the casing and adapted to hold the parts in operative position.

5. In a controller, the combination with a casing, of a conductor outlet bushing detachably mounted in the casing, a removable support for the switch contacts and resistance elements, said support being interlockingly positioned in the casing to prevent rotation and provided with a member contacting with a portion of the outlet bushing, a plate interlockingly positioned on the support, a controller-operating lever pivoted on the plate, and a cover-plate in engagement with the plate and attached to the casing.

6. In a controller, the combination with a casing, of a conductor outlet bushing detachably mounted in the casing, flanges within the casing, a support for the switch contacts and resistance elements having interlocking engagement with the flanges and carrying a member abutting the outlet bushing, a plate interlockingly positioned on the support, a controller-operating lever pivoted on the plate, and a cover-plate in engagement with the plate and attached to the casing.

7. In a controller, the combination with a pivoted lever having a projection thereon and contacts controlled by the lever, of pivoted opposing spring-operated arms having curved surfaces with which the projection on the lever coöperates to retain the lever in any adjusted position, said curved surfaces lying adjacent to the path defined by the contacting point of the projection on the lever.

8. In a controller, the combination with a pivoted lever having a projection thereon and contacts controlled by the lever, of pivoted, opposing spring-operated arms having curved surfaces with which the projection on the lever coöperates to retain the lever in any adjusted position, additional pivoted, opposing spring-operated arms having opposing converging surfaces coöperating with the lever, one pair of arms being supported by the other pair, and means for securing them together in either of two positions so as to place one or the other pairs of arms in coöperating relation with the projection on the lever.

OSCAR H. PIEPER.
ALPHONSE F. PIEPER.

Witnesses:
G. WILLARD RICH,
NELSON COPP.